United States Patent

Hakala

[11] 3,892,172
[45] July 1, 1975

[54] APPARATUS FOR MAKING CHEESE AND THE LIKE

[75] Inventor: Reynold M. Hakala, St. Paul, Minn.

[73] Assignee: The De Laval Separator Company, Poughkeepsie, N.Y.

[22] Filed: Apr. 3, 1973

[21] Appl. No.: 347,421

[52] U.S. Cl. .................. 99/458; 99/495; 210/242; 426/188; 426/361
[51] Int. Cl. .......................................... A01j 25/11
[58] Field of Search ............ 99/456, 457, 458, 459, 99/495; 210/242, 122; 426/478, 361, 36, 188

[56] References Cited
UNITED STATES PATENTS

| 33,969 | 12/1861 | Turner | 210/242 |
|---|---|---|---|
| 1,647,808 | 11/1927 | Neumann | 210/242 |
| 1,803,604 | 5/1931 | Dudycha | 210/242 |
| 3,602,992 | 9/1971 | Peters | 99/459 |

Primary Examiner—John W. Huckert
Assistant Examiner—Stuart S. Levy
Attorney, Agent, or Firm—Cyrus S. Hapgood

[57] ABSTRACT

A strainer box is lowered onto the mass of cheese curds and whey in a tank, the box being supported by float means in a partly submerged operating position in the mass so that whey is strained into a collecting chamber of the box. The box descends freely in this position as the level of the mass is lowered by withdrawing whey from the chamber through a tube movable with the box and connected to a stationary suction duct outside the tank, the latter connection including pipe sections and swivel joints for accommodating vertical movements of the box. Control means are provided for operating a power means to raise the box from the mass in response to the latter reaching a low level in the tank, and for operating the power means to hold the box in a predetermined raised position.

7 Claims, 6 Drawing Figures

APPARATUS FOR MAKING CHEESE AND THE LIKE

This invention relates to cheese-making apparatus of the type having a tank in which a mass of the cheese mix is treated in preparation for withdrawing whey from the curds while the latter are still in the tank. More particularly, the invention relates to improved means for effecting this withdrawal of the whey.

It is known in the art to provide such a tank with power-driven equipment for cutting the cheese mass gently without reducing the curds to such small pieces that the cheese grains will accompany the whey which passes through a screen to the collecting chamber of a strainer box. This equipment also serves to agitate the cut mass during the whey separating operation. An example of this equipment is disclosed in Dutch patent No. 135,211, which became available for public inspection on May 9, 1968.

It is also known in the art to equip the tank with power means connected to such a strainer box and controlled so as to prevent the box from sinking too far into the cheese mass while lowering the box at approximately the same rate as the level of the mass descends due to withdrawal of whey from the collecting chamber of the box. The power means are also controlled to raise the strainer box from the cheese mass when its level descends to a certain low point at the end of the de-wheying operation.

This prior equipment for the strainer box leaves much to be desired. For example, the control for the associated power means is complicated by its need for devices which sense when the box is too submerged or not sufficiently submerged in the cheese mass as its level descends, and which influence the power means so as to restore the desired degree of submergence. Moreover, the prior equipment does not comply with sanitary or hygienic requirements in some localities, particularly with respect to the arrangement for withdrawing the whey from the strainer box as the latter descends more or less with the level of the cheese mass.

Objects of the present invention are to provide equipment which avoids the above-mentioned complication and which fully complies with such sanitary and hygienic requirements.

According to the invention, the strainer box has float means for supporting the box in a partly submerged operating position in the cheese mass, whereby the whey is strained into the collecting chamber of the box as it floats downward with the descending level of the cheese mass. The power means for the strainer box are operable manually to lower the box into this operating position and then allow it to descend freely with the level of the cheese mass, and a control operates the power means to raise the box from the mass in response to its level reaching a low point in the tank. When the box is raised to its starting position, the power means are operated to discontinue further movement of the box.

In the preferred embodiment of the invention, the whey is withdrawn from the collecting chamber of the strainer box by way of a tube movable with box and communicating through a flexible connection with a stationary suction duct outside the tank; and the flexible connection comprises swivel joints connecting pipe sections in series to each other and to the movable tube and stationary duct, thereby forming a sanitary connection for accommodating vertical movements of the strainer box.

For a better understanding of the invention, reference may be had to the accompanying drawings in which.

Figure 1:
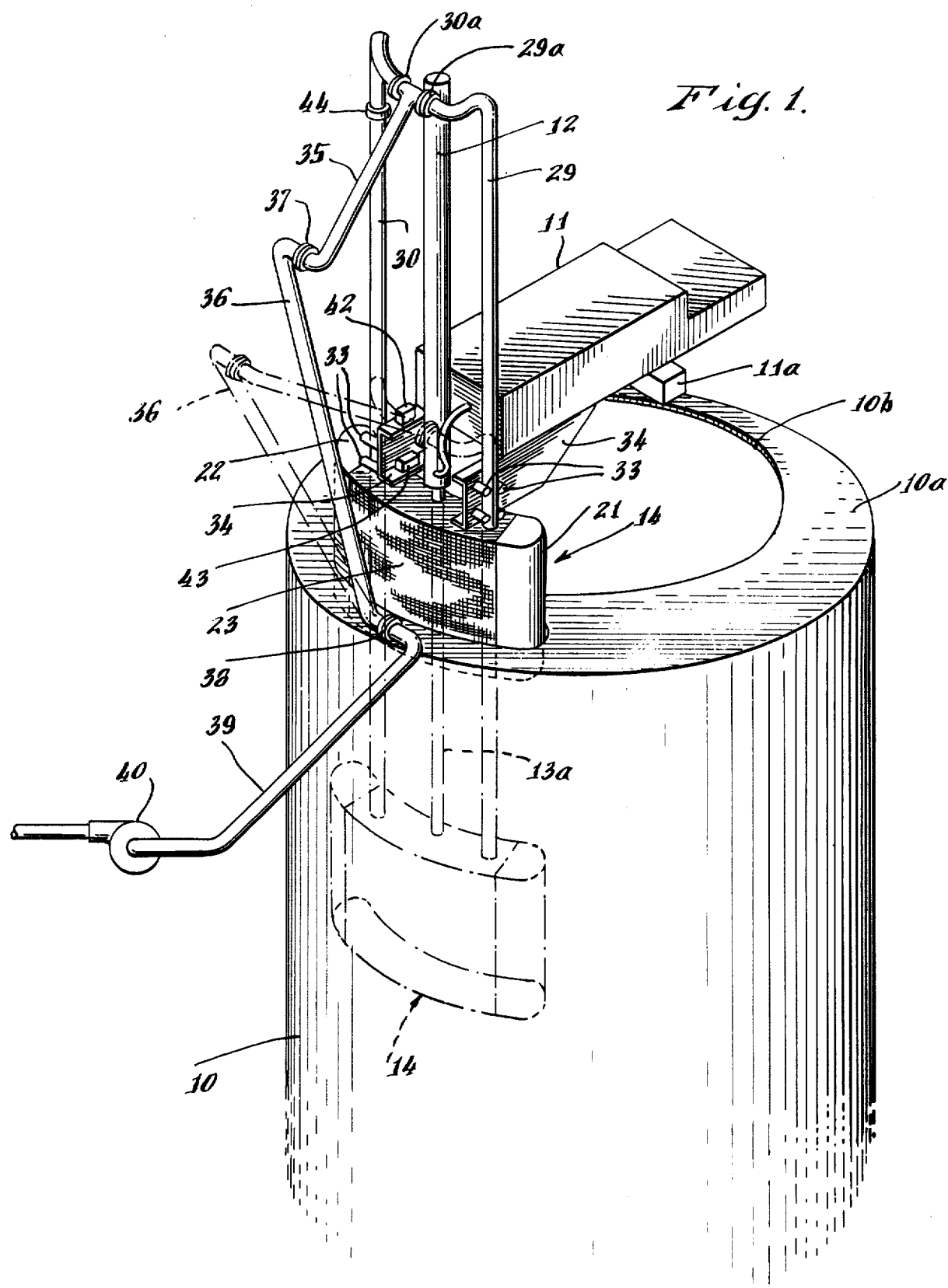
FIG. 1 is a perspective view of a cheese-making tank equipped with a preferred embodiment of the invention.
Figure 3:
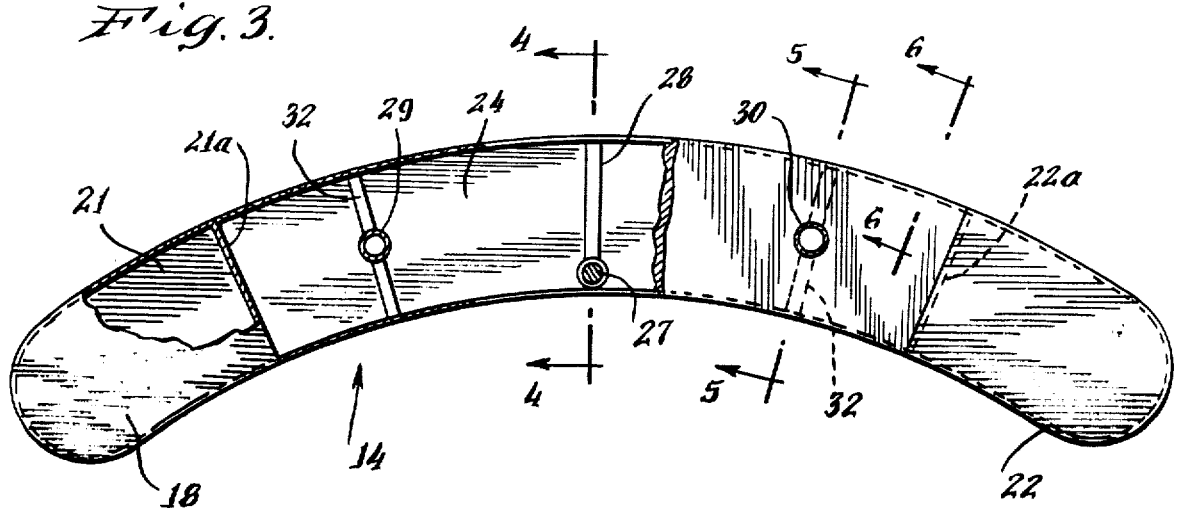
Figure 4:
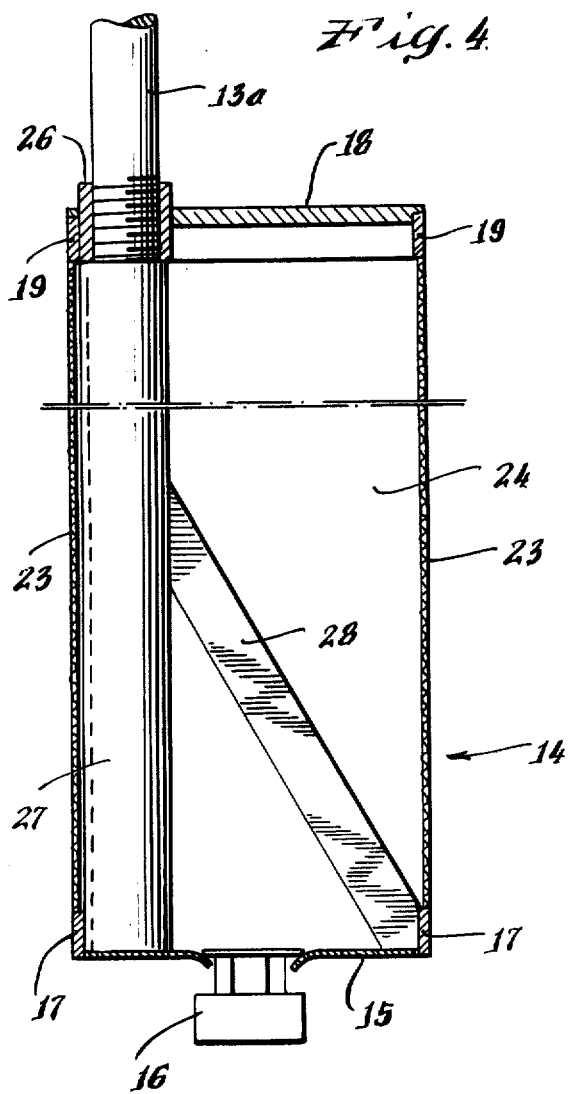
Figure 5:
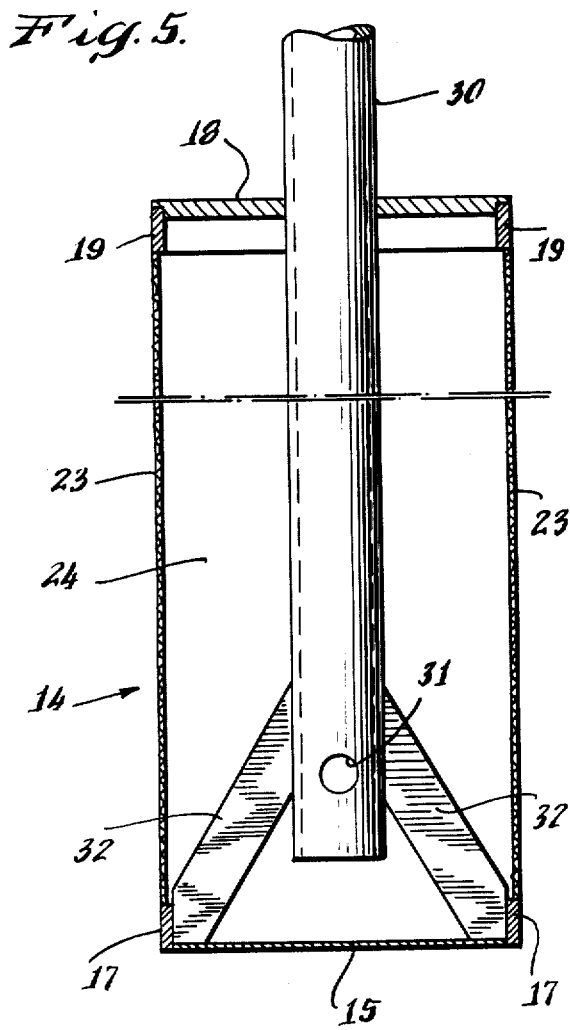
Figure 6:
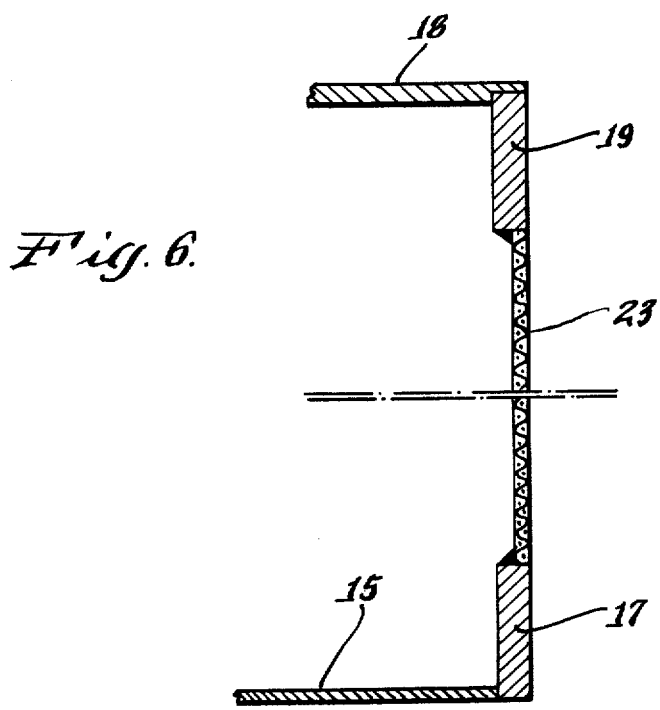

FIG. 3 is a plan view of the strainer box of FIG. 1, with parts broken away, and FIG. 4, 5 and 6 are sectional views on lines 4—4, 5—5 and 6—6, respectively, in FIG. 3.

Referring to FIG. 1, the cheese-making tank 10 is provided at the top with an annular rim 10a defining a central access opening 10b. The previously mentioned cutting and agitating equipment (not shown) is suitably mounted on the tank so that the cutting and agitating elements are suspended and driven in the tank from above this access opening.

A housing 11 is mounted on the tank above the opening 10b by means of a bracket 11a. Secured to this bracket, as by welding, is a cylinder 12 containing a piston 13 (FIG. 2) having a rod 13a. This rod extends downward through a seal in the bottom of the cylinder and is connected at its lower portion to a strainer box 14. The latter is somewhat arcuate in plan view and is adapted to be lowered into the tank through an arcuate opening in the rim 10a.

As shown, the strainer box 14 comprises a bottom 15 provided with a drain plug 16 and having upstanding flanges 17 along its edge portions, and a top 18 having downwardly extending flanges 19 along its edges. At its opposite end portions, the box has closed air chambers 21 and 22 forming float means for supporting the box partly submerged in the cheese mass in the tank. Between these float chambers, the box has opposing side walls formed by suitable screening 23 through which whey is strained from the curds of the cheese mass and enters a collecting chamber 24 of the box. The screening 23 is welded or otherwise secured along its top and bottom edges to the flanges 19 and 17, respectively, and along its opposite end edges to the adjacent partitions 21a and 22a of the respective float chambers.

Piston rod 13a is threaded at its lower end into a fitting 26 secured, as by welding, in the cover 18 (FIG. 4). A column 27 is secured between the bottom 15 and the fitting 26 and additional support is provided by a brace 28 between this column and the remote lower flange 17.

The whey collecting chamber 24 is provided with two discharge tubes 29 and 30 located near the float partitions 21a and 22a, respectively (FIG. 3). Each of these tubes extends downward through cover 18 with a sealed fit and is suitably connected to the cover, the lower end of the tube being spaced somewhat above the bottom 15 of the strainer box (FIG. 5). Near its lower end, each tube 29 and 30 has diametrically opposed openings 31 and is braced by legs 32 connected to the bottom flanges 18.

As shown in FIG. 1, the discharge tubes 29 and 30 are guided for vertical movements by guide members 33 secured to fixed brackets 34 above the tank. At their upper ends, the tubes are connected through respective swivel joints 29a and 30a to a common pipe section 35, which extends at right angles to the swivel axis of these joints. The outer end of pipe section 35 is connected to the upper end of another pipe section 36 through a swivel joint 37; and the lower end of pipe section 36 is connected through a swivel joint 38 to a suction duct 39, the joint 38 being secured to the top rim 10a of the tank. The swivel axes of the pipe joints 37 and 38 are parallel to each other and to the common swivel axis of the joints 29a–30a. The stationary duct 39 has a pump 40 for creating the necessary suction to discharge the whey from the strainer box chamber 24 via tubes 29–30 and pipe sections 35–36 to the stationary duct 39.

The pipe sections 35–36 and the several swivel joints are of the sanitary type, as are the tubes 29–30 and duct 39. Moreover, sanitary conditions are easily maintained by the fact that a minimum number of moving parts actually enter the tank, and the whey discharge line from the upper ends of ducts 29–30 is offset from the tank opening 10b and is easily accessible for disassembly and cleaning.

It will be understood that when the strainer box 14 is in its uppermost position, shown in full lines in FIG. 1, the pipe sections 35–36 are in their full-line positions. As the strainer box 14 descends, the upper end of section 36 moves outwardly about swivel 38 so that the sections will reach the positions shown in broken lines. Thereafter, further downward movement of box 14 is accommodated by the upper end of section 36 swinging inwardly and the two sections approaching parallelism.

The cylinder 12 and its piston serve as a power source to move the strainer box 14 vertically under control of means including upper and lower limit switches shown generally at 42 and 43, respectively, in FIG. 1 and which are mounted on one of the brackets 34. The switch 43 is adapted to be actuated by an upper detent 44 on duct 30 when the box 14 reaches its desired lowermost position in the tank, and the switch 42 is adapted to be actuated by a lower detent 45 (shown only in FIG. 2) on duct 30 when box 14 is raised to its desired uppermost position. These detents are adjustable vertically on duct 30 to vary the aforementioned extreme positions of the strainer box.

Figure 2:
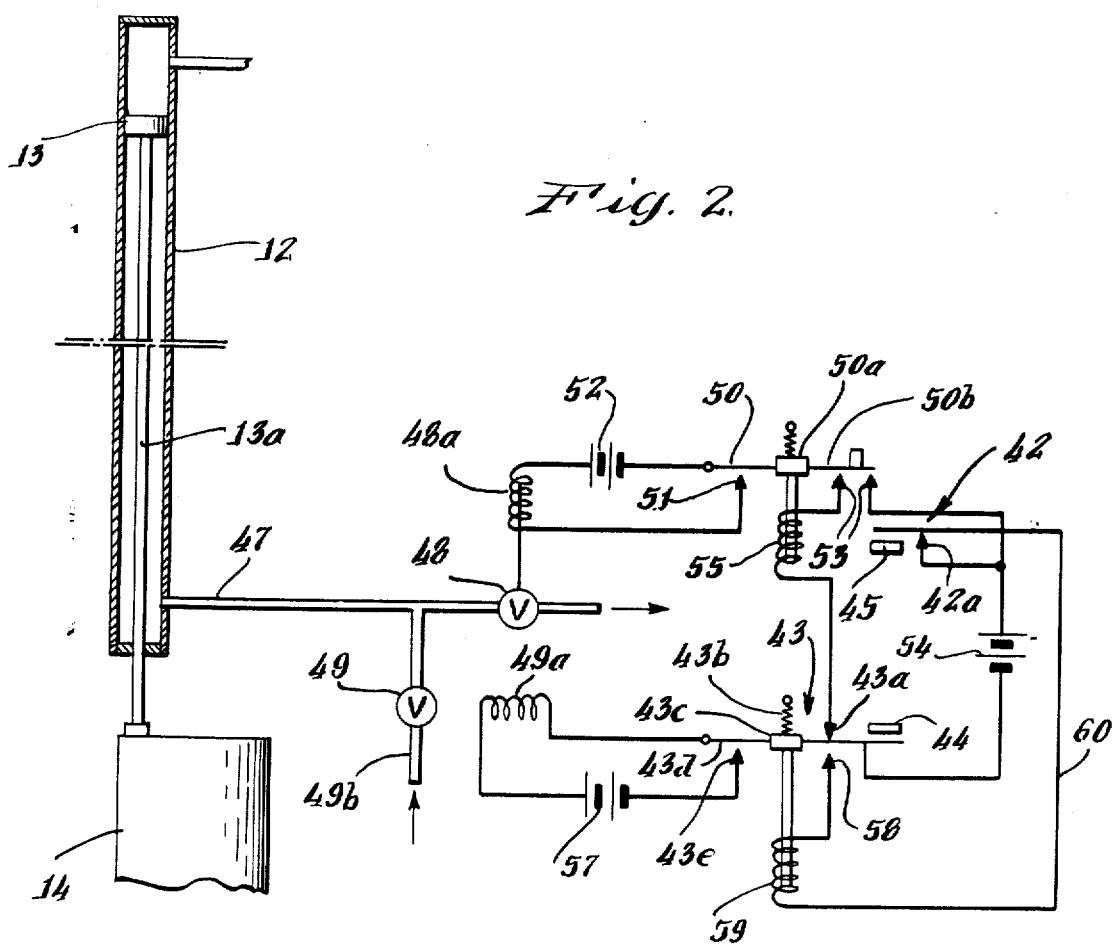
FIG. 2 is a vertical sectional view of the power means shown in FIG. 1 for lowering and raising the strainer box, and a schematic view of the control for the power means.

Referring to FIG. 2, a duct 47 communicates with the lower portion of cylinder 12 and has two branches provided with solenoid valves 48 and 49, respectively. Duct 47 is vented to atmosphere when valve 48 is open and is connected to a compressed air line 49a when valve 49 is open. The vent valve 48 is normally closed but is opened by manually depressing a switch arm 50 to engage contact 51, thereby energizing solenoid 48a through current source 52. Switch arm 50 has an insulator 50a and a section 50b which, upon depressing the arm, bridges contacts 53 and thereby establishes a holding circuit including current source 54, an outer section of the arm of lower limit switch 43, which normally engages upper contact 43a, and solenoid 55. The latter is therefore energized and operates, through its mechanical connection with insulator 50a, to hold switch arm 50 in its depressed position after its release.

The arm of limit switch 43 is held in its normal raised position by a spring 43b connected to an insulator 43c of the arm, whereby its inner section 43d is disengaged from an underlying contact 43e. Consequently, the circuit for energizing the solenoid 49a of valve 49, and which includes current source 57, is broken so that valve 49 prevents compressed air from entering cylinder 12.

Thus, while switch arm 50 is in its depressed position, the lower part of cylinder 12 is vented through valve 48 so that piston 13 and strainer box 14 descend under the action of gravity. An excessive rate of descent is prevented by properly sizing the venting orifice of valve 48. When the strainer box reaches its partly submerged operating position in the cheese mass in the tank, its float means 21–22 (FIG. 3) prevent it from sinking further into the mass. However, as whey filters into the collecting chamber 24 and is withdrawn through the suction tubes 29–30, thereby lowering the level of the cheese mass, the strainer box moves freely downward with this level while maintaining its partly submerged operating position in the mass.

When the cheese mass has been sufficiently de-wheyed, the strainer box 24 will have descended to a certain level in the tank. At this point, the detent 44 on the descending tube 30 will engage the arm of switch 43 (FIG. 2) and lower it against the action of spring 43. This breaks the holding circuit including solenoid 55 so that the latter, after a short delay, allows switch arm 50 to return to its raised position and thereby reclose the vent valve 48. But this time, detent 44 will have depressed the arm of switch 43 to its lower position to energize solenoid 49a and open valve 49. At the same time, the outer section of this switch arm engages contact 58 to establish a holding circuit through solenoid 59, wire 60, upper limit switch 42 (which is now closed) and current source 54. Consequently, strainer box 14 is raised by compressed air which enters cylinder 12 through valve 49; and thus continues even after detent 44 begins its ascent, since the arm of switch 43 remains in its lower position due to the mechanical connection of its insulator 43c to the energized solenoid 59.

When strainer box 14 has been raised from the cheese mass and reaches its upper or starting position, as shown in full lines in FIG. 1, the ascending detent 45 (FIG. 2) on suction tube 30 engages the arm of upper limit switch 42 and lifts it from the underlying contact 42a, thereby opening this switch and breaking the holding circuit including solenoid 59 so that the arm of lower limit switch 43 returns to its raised position against contact 43a. As a result, solenoid 49a is deenergized and causes valve 49 to return to its normal closed position so as to prevent further upward movement of piston 13 and strainer box 14. The system is now ready for the next operating cycle after the de-wheyed cheese mass has been removed from the tank and replaced by a new batch of cheese mix.

It will be apparent that with the control parts in their normal positions as shown in FIG. 2 (with both of the valves 48–49 closed), the strainer box 14 is held in its fully raised position until the next operating cycle is initiated by depressing switch arm 50, whereupon the upper limit switch 42 is reclosed as the actuating detent 45 begins its descent.

I claim:

1. The combination of a tank for holding a mass of cheese curds and whey, a strainer box having a whey-collecting chamber with a perforated wall adapted for straining of whey from said mass and into the chamber, the strainer box also having float means for supporting the box in a partially submerged operating position in said mass to effect said straining, the box being movable downward to and upward from said operating position, a downwardly extending tube which opens into said whey-collecting chamber and which is secured to said box for up and down movements therewith, a suction duct outside the tank and connected to the upper end of said tube for withdrawing whey from said chamber, a power source for lowering the strainer box to said mass and then allowing the box to descend freely in said operating position in the mass as the level thereof is lowered by said whey withdrawal, and control means associated with said power source for operating the same to raise the strainer box in response to said mass reaching a low level in the tank.

2. The combination of claim 1, in which said float means form a closed chamber.

3. The combination of claim 1, in which said power source includes a piston member, a cylinder member containing the piston member and having a vent, one of said members being stationary and the other being connected to the strainer box, a source of pressure fluid, and valve means operable in a first condition to open said vent while disconnecting the cylinder from said pressure fluid source, whereby the strainer box descends by gravity, said valve means being operable in a second condition to close said vent while connecting the cylinder to said source, whereby the strainer box is raised by the action of said pressure fluid.

4. The combination of claim 3, in which said control means include a first switch operable manually to place the valve means in said first condition therof, and a second switch operable to place the valve means in said second condition thereof in response to the mass reaching said low level in the tank.

5. The combination of claim 3, in which said valve means are operable in a third condition to close said vent while disconnecting the cylinder from said source, whereby vertical movement of the strainer box is prevented, said control means including a first switch operable manually to place the valve means in said first condition thereof, a second switch operable to place the valve means in said second condition thereof in response to the mass reaching said low level in the tank, and an element operable to place the valve means in said third condition in response to raising of the strainer box to a predetermined height.

6. The combination of claim 1, in which said control means include a first switch operable manually to effect said lowering of the strainer box by the power source and a second switch operable to raise the box by the power source in response to the mass reaching said low level in the tank.

7. The combination of claim 1, in which said suction duct is stationary, the combination comprising also two pipe sections, a swivel joint between adjacent ends of the respective pipe sections, and swivel joints connecting the opposite ends of the pipe sections to said tube and said stationary duct, respectively, whereby said sections and joints accommodate vertical movements of the strainer box while connecting said tube to the suction duct.

* * * * *